(12) United States Patent
Horesh et al.

(10) Patent No.: US 11,379,611 B1
(45) Date of Patent: Jul. 5, 2022

(54) METHOD AND SYSTEM FOR PRIVACY-PROTECTED EXECUTION OF A WORKFLOW IN A SOFTWARE APPLICATION USING ENCRYPTED INPUTS

(71) Applicant: INTUIT INC., Mountain View, CA (US)

(72) Inventors: Yair Horesh, Hod Hasharon (IL); Yehezkel S. Resheff, Hod Hasharon (IL); Shimon Shahar, Rishon Letziyon (IL); Oren Sar Shalom, Hod Hasharon (IL)

(73) Assignee: INTUIT INC., Mountain View, CA (US)

( * ) Notice: Subject to any disclaimer, the term of this patent is extended or adjusted under 35 U.S.C. 154(b) by 432 days.

(21) Appl. No.: 16/522,356

(22) Filed: Jul. 25, 2019

(51) Int. Cl.
*G06F 21/62* (2013.01)
*H04L 9/08* (2006.01)
*H04L 9/40* (2022.01)
*H04L 9/00* (2022.01)

(52) U.S. Cl.
CPC .......... *G06F 21/6245* (2013.01); *H04L 9/008* (2013.01); *H04L 9/0825* (2013.01); *H04L 63/0442* (2013.01)

(58) Field of Classification Search
CPC ... G06F 21/6245; H04L 9/008; H04L 9/0825; H04L 63/0442
USPC ........................................................ 713/164
See application file for complete search history.

(56) References Cited

U.S. PATENT DOCUMENTS

| | | | | |
|---|---|---|---|---|
| 7,120,928 B2* | 10/2006 | Sheth | .................... | G06F 16/954 713/184 |
| 7,644,285 B1* | 1/2010 | Murray | .................. | G06F 21/31 713/168 |
| 8,001,021 B1* | 8/2011 | Quinn | .................. | G06Q 10/063 705/7.29 |
| 8,041,127 B2* | 10/2011 | Whitelaw | ........... | G06F 21/6209 382/229 |
| 8,683,223 B2* | 3/2014 | Forlenza | ................. | G06F 21/62 713/182 |
| 2005/0108170 A1* | 5/2005 | Hailpern | ................ | G06Q 30/06 705/51 |

(Continued)

FOREIGN PATENT DOCUMENTS

WO  WO-2007019446 A2 *  2/2007  ......... G06F 19/3418

OTHER PUBLICATIONS

Ming-quan Hong, "Homomorphic Encryption Scheme Based on Elliptic Curve Cryptography for Privacy Protection of Cloud Computing" IEEE, 2016 (Year: 2016).*

(Continued)

*Primary Examiner* — Samson B Lemma
(74) *Attorney, Agent, or Firm* — Patterson + Sheridan, LLP

(57) ABSTRACT

Certain aspects of the present disclosure provide techniques for privacy-preserving execution of a workflow in a software application. Embodiments include generally includes receiving homomorphically encrypted inputs from a client device corresponding to user-provided data needed to calculate a result for a step of a workflow in the software application. A result is calculated for the step of the workflow using the received homomorphically encrypted inputs. The calculated result is returned to the client device. The calculated result is homomorphically encrypted as a result of (Continued)

calculating the result using the received homomorphically encrypted inputs.

10 Claims, 6 Drawing Sheets

(56) References Cited

U.S. PATENT DOCUMENTS

| | | | | |
|---|---|---|---|---|
| 2009/0029766 A1* | 1/2009 | Lutnick | ............... | G07F 17/3232 463/29 |
| 2009/0150169 A1* | 6/2009 | Kirkwood | ............... | G06Q 40/00 705/342 |
| 2012/0198234 A1* | 8/2012 | Chung | ................. | H04L 9/3247 713/176 |
| 2014/0214705 A1* | 7/2014 | Balazs | ................. | G06Q 30/018 705/319 |

OTHER PUBLICATIONS

Tianhe Gong, "A Medical Healthcare System for Privacy Protection Based on IoT" IEEE, 2015 (Year: 2015).*

* cited by examiner

METHOD AND SYSTEM FOR PRIVACY-PROTECTED EXECUTION OF A WORKFLOW IN A SOFTWARE APPLICATION USING ENCRYPTED INPUTS

INTRODUCTION

Aspects of the present disclosure generally relate to execution of workflows using confidential data in software applications, and more specifically to executing workflows in the software application while maintaining data privacy during execution of these workflows in the software application.

BACKGROUND

Workflows in software applications may operate on data that is confidential or that a user of these software applications otherwise would not like to share. For example, in a tax return preparation workflow, this data may include personally-identifiable information, such as national identity numbers (e.g., Social Security Numbers in the United States, National Insurance Numbers in the United Kingdom, etc.), wage income and withholding information, and other financial data. In another example, in an accounting workflow, this data may include income and expenditure data that may be market-sensitive or otherwise should remain confidential until a given time in the future. In environments where these workflows are hosted remotely, this data may be protected while in transit from a client device to a server on which these workflows are hosted by encrypting the data. This data may be decrypted by the workflow in order to generate a result of the workflow. The data provided by a user to the workflow and the generated results of the workflow may subsequently be stored in a data store and may be encrypted to protect against data-at-rest attacks.

However, sensitive data may not be protected when security breaches occur. For example, if a cryptographic key used to encrypt the user's sensitive data is compromised, attackers can decrypt and obtain a user's sensitive data. In another example, malicious code may be injected into a software application and exfiltrate sensitive data while the software application is executing a workflow. Still further, even if data provided to a software application is stored in an encrypted form, the provider of the software application may retain the cryptographic keys needed to decrypt the data. Because of various security considerations related to the risk of sensitive data being compromised and/or shared, users may not be willing to use software applications that process and store sensitive data on remote systems.

Accordingly, techniques are needed to execute workflows in a software application to preserve data privacy during and after execution of the workflows in the software application.

BRIEF SUMMARY

Certain embodiments provide a computer-implemented method for privacy-preserving execution of a workflow in a software application. The method generally includes receiving homomorphically encrypted inputs from a client device corresponding to user-provided data needed to calculate a result for a step of a workflow in the software application. A result is calculated for the step of the workflow using the received homomorphically encrypted inputs. The calculated result is returned to the client device. The calculated result is homomorphically encrypted as a result of calculating the result using the received homomorphically encrypted inputs.

Other embodiments provide a system comprising a processor and a non-transitory computer-readable memory storing instructions that, when executed by the processor, perform an operation for privacy-preserving execution of a workflow in a software application. The operation generally includes receiving homomorphically encrypted inputs from a client device corresponding to user-provided data needed to calculate a result for a step of a workflow in the software application. A result is calculated for the step of the workflow using the received homomorphically encrypted inputs. The calculated result is returned to the client device. The calculated result is homomorphically encrypted as a result of calculating the result using the received homomorphically encrypted inputs.

Still further embodiments provide a computer-readable medium having instructions stored thereon which, when executed, performs an operation for privacy-preserving execution of a workflow in a software application. The operation generally includes receiving homomorphically encrypted inputs from a client device corresponding to user-provided data needed to calculate a result for a step of a workflow in the software application. A result is calculated for the step of the workflow using the received homomorphically encrypted inputs. The calculated result is returned to the client device. The calculated result is homomorphically encrypted as a result of calculating the result using the received homomorphically encrypted inputs.

Certain embodiments provide a computer-implemented method for privacy-preserving execution of a workflow in a software application. The method generally includes displaying a prompt for user input associated with items to be used in performing a step of a workflow in the software application. User input for each of the items to be used in performing the step of the workflow is received and homomorphically encrypted using an encryption key. The homomorphically encrypted user input and a request to perform the step of the workflow using the homomorphically encrypted user input is transmitted to an application server, and a homomorphically encrypted result of the step of the workflow is received from the application server. The received homomorphically encrypted result is decrypted using a decryption key associated with the encryption key, and the decrypted result is displayed on a display coupled to the client device.

Other embodiments provide a system comprising a processor and a non-transitory computer-readable memory storing instructions that, when executed by the processor, perform an operation for privacy-preserving execution of a workflow in a software application. The operation generally includes displaying a prompt for user input associated with items to be used in performing a step of a workflow in the software application. User input for each of the items to be used in performing the step of the workflow is received and homomorphically encrypted using an encryption key. The homomorphically encrypted user input and a request to perform the step of the workflow using the homomorphically encrypted user input is transmitted to an application server, and a homomorphically encrypted result of the step of the workflow is received from the application server. The received homomorphically encrypted result is decrypted using a decryption key associated with the encryption key, and the decrypted result is displayed on a display coupled to the client device.

Still further embodiments provide a computer-readable medium having instructions stored thereon which, when executed, performs an operation for privacy-preserving execution of a workflow in a software application. The operation generally includes displaying a prompt for user input associated with items to be used in performing a step of a workflow in the software application. User input for each of the items to be used in performing the step of the workflow is received and homomorphically encrypted using an encryption key. The homomorphically encrypted user input and a request to perform the step of the workflow using the homomorphically encrypted user input is transmitted to an application server, and a homomorphically encrypted result of the step of the workflow is received from the application server. The received homomorphically encrypted result is decrypted using a decryption key associated with the encryption key, and the decrypted result is displayed on a display coupled to the client device.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
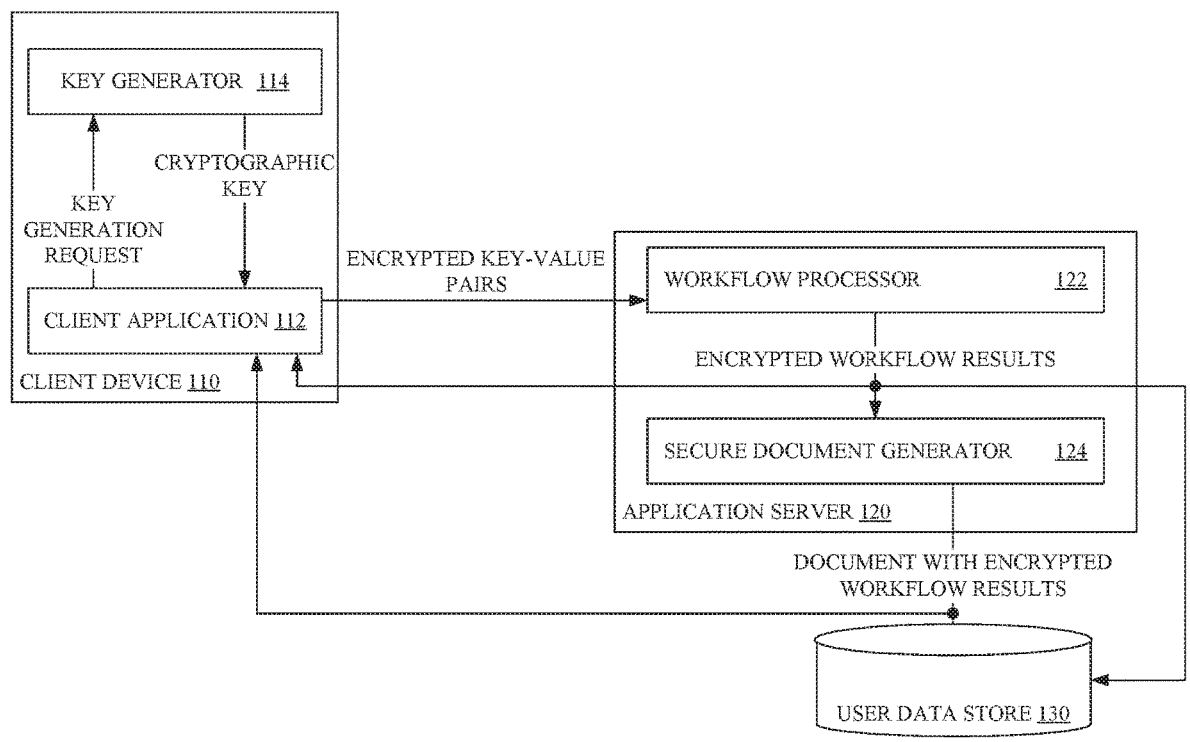
FIG. 1 depicts an example computing environment in which a workflow in a software application is securely executed using encrypted inputs that are not decrypted during execution of the workflow.

Aspects of the present disclosure provide apparatuses, methods, processing systems, and computer readable mediums for privacy-preserving execution of a workflow in a software application.

Generally, to preserve the privacy of user-provided data in a workflow, a system on which a software application including the workflow is hosted receives encrypted data from a user and performs mathematical operations on the encrypted user-provided data without decrypting the encrypted user-provided data. This is possible when the user-provided data is encrypted by a technique that retains the ability for the mathematical operations to be performed on the encrypted data, such as homomorphic encryption. Because the workflow performs mathematical operations on encrypted user-provided data, the results of the workflow are also encrypted, and the content of the encrypted user-provided data is never actually exposed to the software application (or provider of the same).

Further, the encrypted user-provided data and the encrypted results of the workflow may be stored in a data store and included in one or more electronic documents generated by the workflow such that a user of the software application may be able to view the decrypted values included in the electronic documents. Other users who do not have the cryptographic keys needed to decrypt the values in the electronic documents are unable to retrieve the encrypted data from the electronic documents.

By executing workflows in a software application using encrypted user-provided data without decrypting the encrypted user-provided data, embodiments described herein may preserve data privacy end-to-end. Encrypted user data may not be decrypted at any point during execution of the workflows so that data encrypted at a client device remains encrypted during execution of the workflow and when the user-provided data is stored in a remote data repository. Because the user-provided data and results of the workflow are encrypted, and because the software application may not have access to cryptographic keys needed to decrypt the user-provided data and the results of the workflow (which are maintained solely by the user that owns the data), providers of the software application and malicious actors may not have access to the underlying user-provided data used to generate the results of the workflow. If, for example, malicious software that exfiltrates data is injected into the software application, the malicious software may exfiltrate meaningless data (e.g., alphanumeric strings from which, without knowledge that a homomorphic encryption scheme is used to encrypt the data, mathematical operations cannot be performed, or numerical data that results in inaccurate calculations) instead of the underlying sensitive data.

Further, the user-provided data and results of the workflow may further be encrypted (e.g., encrypted for transport between the user and the software application provider) so that even if one encryption key is compromised, the data is protected (and privacy is preserved) by another encryption key. Encryption of the already-encrypted user-provided data and results of the workflow may be used, for example, where a software application executes as a cloud-based application in which data is transmitted across an unsecure channel between a client device and the servers on which the software application executes. Because data may be exposed to interception while in transit between the client device and the servers on which the software application executes, encryption of already-encrypted user-provided data may be used so that a compromise to one of the keys used to encrypt the data does not compromise the privacy of the data.

Example Privacy-Preserving Execution of Workflows in a Software Application

FIG. 1 illustrates a computing environment 100 in which workflows in a software application are executed using encrypted data to preserve the privacy of user-provided information during execution of the workflows, according to an embodiment.

As illustrated, computing environment 100 includes a client device 110, an application server 120, and a user data store 130, connected via a network. The network may be a wired or wireless network.

Client device 110 generally executes a client application 112 that allows a user of a software application hosted on an application server 120 to access and interact with the workflow processor 122 (which may be a part of an application hosted by application server 120) using encrypted data. Client application 112 may be downloaded to and installed on client device 110 when a user initially interacts with the software application or on-demand (e.g., when an existing user interacts with the software application on a new client device).

When a user initially interacts with the software application (e.g., upon user registration, initial download of application components from application server 120, etc.), client application 112 may be instructed to transmit a key generation request to a key generator 114 on client device 110 or a key generator on a remote key management server and receive a cryptographic key for use in encrypting user-provided data prior to sending the user-provided data to application server 120. In some embodiments, the cryptographic keys generated by key generator 114 may be saved locally on client device 110 for future retrieval. As discussed in further detail below, the cryptographic keys may be generated for use in a homomorphic encryption scheme that allows mathematical operations to be performed on encrypted data without first decrypting the data. These cryptographic keys may include symmetric cryptographic keys (in which the keys or a permutation of the keys are used both in encryption and decryption) or asymmetric encryption and asymmetric decryption keys.

During execution of workflows in a software application hosted on application server 120, client application 112 may be instructed by the software application to display user interface elements to a user of the software application in which the user can enter unencrypted data requested by a step of the workflow in the software application.

To preserve the privacy of the user-provided data, client application 112 can encrypt the user-provided data using the cryptographic key and transmit the encrypted data to a workflow processor at application server 120. The encrypted data may be transmitted, for example, as a plurality of key-value pairs, with each key-value pair identifying the field in which data was entered and an encrypted version of the data entered into the field. The application server 120 may execute the workflow using the encrypted versions of the data entered into the field and generate a response which is also encrypted by virtue of having been generated from encrypted data, as discussed in further detail below. In response, client application 112 may receive encrypted workflow results generated from the encrypted user-provided data and/or a document including the encrypted workflow results when the workflow is completed. Using the cryptographic key, client application 112 can decrypt the encrypted workflow results and the encrypted data included in the received document and display the actual underlying data (e.g., the results of the workflow and the information included in the received document) to the user.

Generally encrypted user-provided data may be encrypted using various homomorphic encryption schemes. These encryption schemes are generally malleable encryption schemes that allow for ciphertexts (e.g., encrypted user-provided data) to be transformed into other ciphertexts that can be decoded using a corresponding key (e.g., the same key used to encrypt the user-provided data in symmetric cryptographic schemes, a derivative of the key used to encrypt the user-provided data in semi-symmetric cryptographic schemes, or the private key of a public/private key pair in asymmetric cryptographic schemes). Examples of these homomorphic encryption schemes that can be used to generate encrypted results from encrypted user-provided data without decrypting the user-provided data into its original values may include, for example, the Brakerski-Gentry-Vaikuntanathan cryptographic scheme, the Cheon-Kim-Kim-Song cryptographic scheme, lattice-based cryptographic schemes, and the like. Generally, these encryption schemes may allow for addition and multiplication operations to be performed on encrypted user-provided data, with the resulting values being inherently encrypted and decryptable using the same key as the key used to encrypt the user-provided data.

In some embodiments, key generator 114 may be a standalone application or an application plug-in (e.g., a browser plugin) from a remote source. Client device 110 may be prompted to download and install key generator 114, for example, at the request of application server 120. In some embodiments, key generator 114 may be downloaded and installed upon initial user registration with the software application, upon initial use of a client device with the software application, or on demand.

In some embodiments, client application 112 may request generation of the cryptographic key from key generator 114. Key generator 114 generally receives the key generation request and returns a generated cryptographic key to client application 112 in response to the key generation request. Key generator 114 may be configured to generate cryptographic keys usable in a homomorphic encryption scheme such that mathematical operations can be performed on the encrypted data without needing to decrypt the encrypted data to recover the underlying data.

In some embodiments, the generated cryptographic keys used to homomorphically encrypt and decrypt user-provided data may be a public/private cryptographic key pair in an asymmetric cryptographic scheme in which the public key can be used to encrypt data and the private key can be used to decrypt the encrypted data. By using public/private cryptographic keys, the user can retain the private key locally (e.g., on client device 110, a removable storage device, etc.) and provide the public key to application server 120 for use in performing mathematical operations on the encrypted user-provided data and predefined values in the software application, as discussed in further detail below. The provision of only a public key to application server 120 may further preserve the privacy of encrypted user-provided data, as the public key cannot be used to decrypt the encrypted user-provided data and recover usable data.

The cryptographic key may be generated using a random number generator to generate a random number or pseudorandom number having a bit size corresponding to a key size for the cryptographic scheme. For example, the cryptographic key may be generated as a 128-bit random number for 128-bit cryptographic scheme. In some embodiments, where a cryptographic key relies on factorization of a product of prime numbers, the cryptographic key may be generated based on two randomly selected prime numbers and, optionally, a salt value used to further complicate factorization of the key. As discussed, the cryptographic key may be generated such that the key is suitable for use in fully homomorphic encryption schemes in which mathematical operations can be performed on encrypted values without first decrypting the encrypted values to recover the underlying data.

In some embodiments, key generator 114 may generate new cryptographic keys during a key rotation process used to ensure the security of user data. A key rotation process may be initiated based on an expiration time associated with a cryptographic key generated by key generator 114. After the key expires, key generator 114 can generate a new cryptographic key and transmit the new cryptographic key to client application 112. Client application 112 can retrieve encrypted user data from user data store 130 and cause user data store 130 to delete the user data. The user data may be decrypted using the now-invalid cryptographic key, and then re-encrypted using the new cryptographic key. After re-encrypting the user data using the new cryptographic key, client application 112 can commit the re-encrypted data to user data store 130 and discard the now-invalid cryptographic key.

In some embodiments, key generator 114 may hosted remotely by a key management authority. The key management authority may generate cryptographic keys upon user request and share the generated cryptographic keys with the client application 112 using various secure key exchange techniques, such as the Diffie-Hellman key exchange protocol. In some embodiments, a remote key generator 114 may provide cryptographic keys to the requesting client application 112, but may not provide those cryptographic keys to application server 120 for use in privacy preserving execution of a workflow.

In some embodiments, different keys are used for encryption and decryption of data. For example, in asymmetric cryptography, an encryption key (e.g., the public key component of a public/private key pair) is used for encryption and a separate decryption key (e.g., the private key component of a public/private key pair) is used for decryption. In another example, in semi-symmetric cryptography, a generated symmetric cryptographic key is used for encryption and a permutation of the symmetric cryptographic key is used for decryption. In these examples, the symmetric cryptographic key or asymmetric encryption key may be provided to both client application 112 and application server 120. The asymmetric decryption key, or in the case of semi-symmetric cryptography, the permutation to apply to the symmetric cryptographic key to obtain the decryption key, may be provided only to client application 112 executing on the client device 110. By providing encryption keys, but not decryption keys, to the application server 120, embodiments described herein may preserve the privacy of user data since application server 120 may be able to encrypt, but not decrypt, sensitive user-provided data using the provided encryption keys. Thus, as discussed in further detail below, application server 120 may perform mathematical operations on data encrypted using a homomorphic encryption scheme without decrypting the underlying data.

In some embodiments, client device 110 and application server 120 may apply an additional layer of encryption to data exchanged between client device 110 and application server 120 across a public communications channel (e.g., the Internet) to provide an additional layer of protection against interception attacks. Generally, by applying an additional layer of encryption to already-encrypted data exchanged between client device 110 and application server 120, recovery of the underlying user-provided data may require that a malicious party compromises both the cryptographic key used to encrypt communications between client device 110 and application server 120 and the cryptographic key used by client device 110 to encrypt the user-provided data. Compromising only one of the two keys used to encrypt communications between client device 110 and application server 120—which is a generally a computationally difficult task—would not result in recovery of the user-provided data.

To encrypt data exchanged between client device 110 and application server 120, client device 110 and application server 120 can perform various operations to establish encryption and decryption keys for securing communications client device 110 and application server 120. In one example, client device 110 and application server 120 can generate encryption and decryption keys using techniques such as the Diffie-Hellman algorithm in which the encryption key is established based on values shared between client device 110 and application server 120, and the decryption keys are generated randomly at each of client device 110 and application server 120.

Application server 120 generally hosts various components of a software application that use data received from a client device to perform calculations related to different steps of a workflow and generate documents including the results of the workflow. As illustrated, application server 122 includes a workflow processor 122 and a secure document generator 134.

Workflow processor 122 may be configured to transmit prompts for data needed to execute a step in a workflow in the software application for display on a user interface of client application 112, receive encrypted user-provided data from client device 110 for use in executing the step of the workflow, and generate result of the workflow (which is still encrypted) without decrypting the received user-provided data.

Generally, workflow processor 122 may be configured to calculate a result for a variety of workflows that involve mathematical operations on encrypted data, without decrypting the encrypted data, so that the privacy of the user's data is maintained during execution of a workflow. For example, workflow processor 122 may be configured to generate a tax return for a user based on various user-provided inputs, some of which may be used in various calculations to determine if a user has overpaid taxes (and is thus eligible for a refund) or underpaid taxes (and is thus required to make an additional payment). In another example, workflow processor 122 may be an accounting application in which transactions are aggregated and tracked to provide information about a user's current balance in one or more accounts, generate income and expenditure reports, profit and loss reports, and the like. Many other workflow applications are possible.

To generate a result of a step of a workflow, workflow processor 122 performs one or more specified mathematical operations using the encrypted values included in the received key-value pairs from client application 112. Generally, addition and multiplication operations may be performed on homomorphically encrypted data in a fully homomorphic encryption scheme. Thus, in some embodiments, subtraction operations may be performed by workflow processor 122 as an addition operation in which the subtrahend (i.e., the value being subtracted) in a subtraction operation is represented as a negative addend in the addition operation. Division operations may be performed by workflow processor 122 as a multiplication operation in which the divisor in the division operation is represented as a fractional multiplier in the multiplication operation. As discussed, the result of a mathematical operation using encrypted values may be encrypted using the same key as that used to encrypt the encrypted values, and thus may be decrypted using the same key used to decrypt the encrypted values. The encrypted workflow results and the encrypted user-provided data used to calculate the results may be stored in user data store 130 and may be provided to secure document generator 134 for the generation of documents in which sensitive data is encrypted, as discussed in further detail below.

In some embodiments, the encrypted workflow results and encrypted user-provided data may be further encrypted using a cryptographic key associated with the application server, which may provide additional protection against hacking attacks or other manners by which data may be compromised. Workflow processor 122 may, for example, further encrypt the encrypted workflow results and encrypted user-provided data using a second encryption scheme that is different from that used to encrypt the workflow results and user-provided data. The second encryption scheme may be a non-malleable encryption scheme that limits an ability to perform mathematical operations or other modifications on the encrypted data without first decrypting the data. For example, the second encryption scheme may be typical unbroken cryptographic schemes used to encrypt data, such as the Advanced Encryption Standard (AES), Blowfish, Twofish, RSA, or other schemes having attacks with worse than brute force complexity. As discussed above, the decryption keys needed to decrypt a communication encrypted using the second encryption scheme may be exchange in various manners, such as Diffie-Hellman key exchange, physically, etc.

In some embodiments, a step of a workflow executed by workflow processor 122 may include one or more constant values used in performing various calculations. Generally, performing mathematical operations using one value that is homomorphically encrypted and another value that is not encrypted may result in the generation of an invalid result, as the unencrypted value may resolve to a different value when decrypted. Thus, to allow for these constant values to be used without decrypting the encrypted user-provided data and performing mathematical operations on the decrypted data, the key used to encrypt the user-provided data (e.g., the asymmetric encryption key in an asymmetric cryptographic scheme, or a variant of a symmetric cryptographic key in a semi-symmetric cryptographic scheme) may be provided to workflow processor 122 for use in encrypting the constant value. Once the constant value is encrypted, mathematical operations may be performed using the encrypted constant value and the encrypted user-provided data so that the workflow can execute without compromising the privacy of the user-provided data.

Because workflow processor 122 does not have a cryptographic key needed to decrypt encrypted user-provided data (e.g., the private key in an asymmetric cryptographic scheme, or the key transformation needed to obtain a decryption key in a semi-symmetric cryptographic scheme), and because breaking a cryptographic key is a computationally difficult task (e.g., a task requiring $2^{128}=3.40*10^{38}$ decryptions to perform a brute-force attack on encryption using a 128-bit key), workflow processor 122 may not be able to examine the encrypted user-provided data in order to verify that the user-provided data is valid. Workflow processor 122 may thus perform mathematical operations on the received encrypted user data and any constants encrypted using the same cryptographic key without performing validity checks on the received data. In some embodiments, to ensure that user-provided data is valid (e.g., is of the right data type and within expected ranges of values) for a given step of a workflow, data verification may thus be performed at client application 112 instead of a workflow processor 122.

In some embodiments, workflow processor 122 may execute a rules-based workflow based on a graph structure used to calculate a result of a workflow, which may be referred to as a calculation graph, and a graph structure used to determine whether sufficient information has been provided to the workflow in order to calculate a valid result, which may be referred to as a completion graph.

The calculation graph may semantically identify data operations that are performed using user-provided data and intermediate calculations performed using the user-provided data, with connections between each node in the calculation graph representing an operation performed using results generated by a particular parent operation in the calculation graph. During execution of the workflow, encrypted user-provided data and encrypted results calculated from the encrypted user-provided data may be inserted into various nodes in the calculation graph. The encrypted data inserted into the calculation graph may be used as encrypted inputs into other nodes in the calculation graph, thus resulting in the generation of encrypted calculation results at each node in the calculation graph. The corresponding completion graph may be a graph that identifies whether information has been provided or calculated for a given data point and determine, based on the presence or absence of specified data points, whether sufficient information has been provided for a calculation to be performed (e.g., whether sufficient information has been provided to execute a step in a workflow).

Secure document generator 124 generally receives encrypted workflow results and encrypted user-provided data from workflow processor 122 and inserts the encrypted workflow results and user-provided data into a document representing the output of the workflow. Non-sensitive data, such as field names and other non-sensitive textual information, need not be encrypted in the document generated by secure document generator 124. While secure document generator 124 is illustrated as executing on application server 120, it should be recognized that documents including the encrypted workflow results and encrypted user-provided data may be assembled by a document generator included in client application 112 executing on client device 110.

User-provided data may be inserted into the document without modification such that a value provided by the user in an encrypted key-value pairing is the value inserted into the appropriate location in the document. For example, assume that a user of a tax return application has indicated that the user's income is $40,000 for the year. The value included in an income line item in the document generated by secure document generator 124 would be an encrypted version of $40,000, rather than the plaintext data. Thus, the value of $40,000 may not be recovered without the appropriate cryptographic key. Likewise, encrypted workflow results may be inserted into the document without modification.

Once a document representing the output of the workflow is generated, secure document generator 124 can transmit an electronic copy of the document to client application 112 (e.g., for viewing, printing, etc.) and save a copy of the generated document to user data store 130. As with the data used to generate the document, the document may be further encrypted using various non-malleable cryptographic schemes to further protect data stored in the document from modification (whether intentional or unintentional). To view the document with the correct values, a user may decrypt the values stored in the document using the appropriate cryptographic key; without the appropriate cryptographic key, the values stored in the document may appear to be meaningless or invalid.

Figure 2:
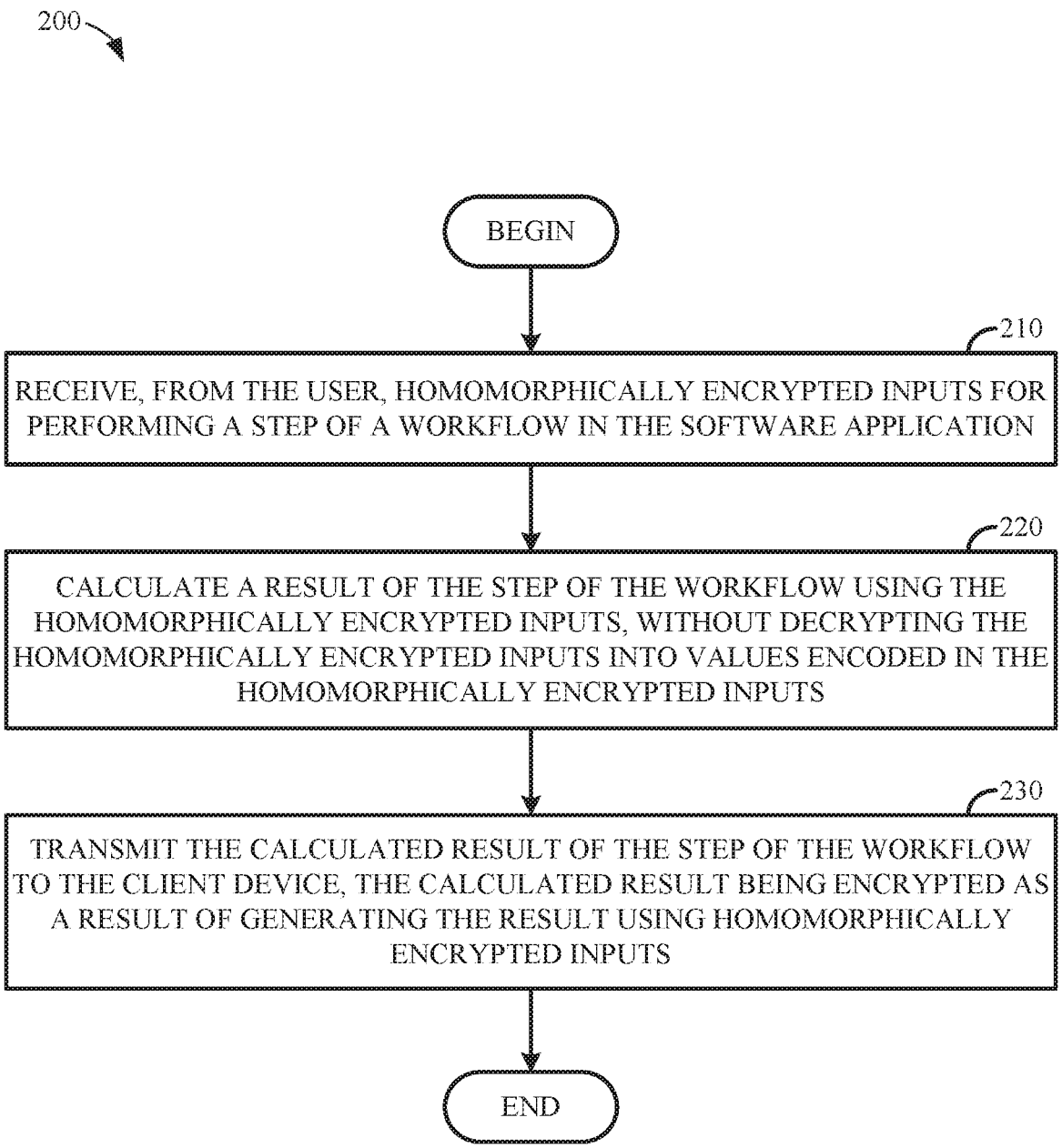
FIG. 2 illustrates example operations for securely executing a workflow in a software application using encrypted inputs that are not decrypted during execution of the workflow.

Example Computer Implemented Method for Privacy Preserving Execution of Workflows in a Software Application FIG. 2 illustrates example operations 200 for executing a workflow in a software application such that the privacy of user-provided data is protected. The operations described herein may be performed on a server hosting a software application (e.g., application server 120 illustrated in FIG. 1). Calculations are performed at the server hosting the software application without decrypting the user-provided data, thereby preserving the privacy of the user-provided data. Further, because the underlying user-provided data is not decrypted, the provider of the software application may be prevented from obtaining the underlying user-provided data, and malicious software may be prevented from exfiltrating the underlying user-provided data.

As illustrated, operations 200 begin at block 210, where a system receives, from a client device, homomorphically encrypted inputs for performing a step of the workflow in the software application. In some embodiments, the system may additionally receive, from the client device or a key generation service, an encryption key used to encrypt the homomorphically encrypted inputs. The encryption key may be, for example, a symmetric cryptographic key in a semi-symmetric cryptographic scheme in which a permutation of the symmetric cryptographic key is used for decryption operations, or an asymmetric encryption key (e.g., a public key component of a public/private key pair). The homomorphically encrypted inputs may have been encrypted using the encryption key prior to transmission from the client device. As discussed, the received homomorphically encrypted inputs may be used as parameters of various arithmetic operations without being decrypted into the underlying values of these encrypted inputs. Further, because semi-symmetric and asymmetric cryptographic schemes use different keys to encrypt and decrypt data, the software application may not be able to decrypt the homomorphically encrypted inputs because the software application may at most have the key used to encrypt the homomorphically encrypted inputs, which will not decrypt the homomorphically encrypted inputs.

At block 220, the system calculates the result of the step of the workflow using the received encrypted inputs. The result of the step of the workflow may be performed without decrypting the received homomorphically encrypted inputs, and the result of the step of the workflow may also be homomorphically encrypted as a result of performing mathematical operations using the homomorphically encrypted inputs. The result, thus, may be decrypted using a decryption key paired with the encryption key used to encrypt the received inputs, as discussed above.

In some embodiments, where the step of the workflow involves performing calculations using pre-defined values, the unencrypted predefined value may not resolve to the same value as the encrypted predefined value, and thus, performing mathematical operations using a homomorphically encrypted input and the unencrypted predefined value may result in the generation of invalid or inaccurate results for the step of the workflow. To allow these predefined values to be used in mathematical operations in the workflow, the system can first encrypt the pre-defined values using the encryption key used to encrypt the homomorphically encrypted inputs and then perform mathematical operations using the encrypted pre-defined values and the encrypted inputs.

At block 230, the system, transmits the calculated result of the step of the workflow to the client device. As discussed, because the calculated result may be generated from mathematical operations on encrypted inputs (and, optionally, encrypted predefined values), the calculated result maintain the homomorphic encryption.

In some embodiments, the system may receive from the client device, an encryption key used to encrypt the homomorphically encrypted inputs. The system may homomorphically encrypt predefined values used in calculating the result for the step of the workflow using the received encryption key and calculate the result for the step of the workflow further based on the homomorphically encrypted predefined values. It should be noted that receiving the encryption key used to encrypt the homomorphically encrypted inputs, as discussed above, may not allow the system to decrypt the homomorphically encrypted inputs, as different keys may be used for encryption and decryption operations.

In some embodiments, the encryption key comprises a public key component of a public/private key pair.

In some embodiments, the system can calculate the result for the step of the workflow by providing the received encrypted inputs to a calculation graph. The system may generate a homomorphically encrypted output of the calculation graph based on the received homomorphically encrypted inputs and rules defined for calculating the encrypted output for the step of the workflow from the received homomorphically encrypted inputs. The system may determine additional steps of the workflow to be executed to complete the workflow based on the encrypted output of the calculation graph without decrypting the homomorphically encrypted output of the calculation graph.

In some embodiments, the system may determine that the workflow is complete. Based on this determination, the system may generate an electronic copy of a document, wherein the electronic copy includes the homomorphically encrypted inputs and the calculated result and transmit the electronic copy of the document to the client device. In some embodiments, the electronic copy of the document may be partially encrypted such that non-sensitive data is included in the electronic copy of the document in plaintext.

In some embodiments, the encrypted inputs may be received as a plurality of key-value pairs, each key being encoded in plaintext and each corresponding value having been encrypted using a homomorphic encryption key.

In some embodiments, the system can the result for the step of the workflow using the received homomorphically encrypted inputs by executing code for the workflow that is unmodified relative to a version of the workflow that calculates results for the step of the workflow using unencrypted data.

Figure 3:
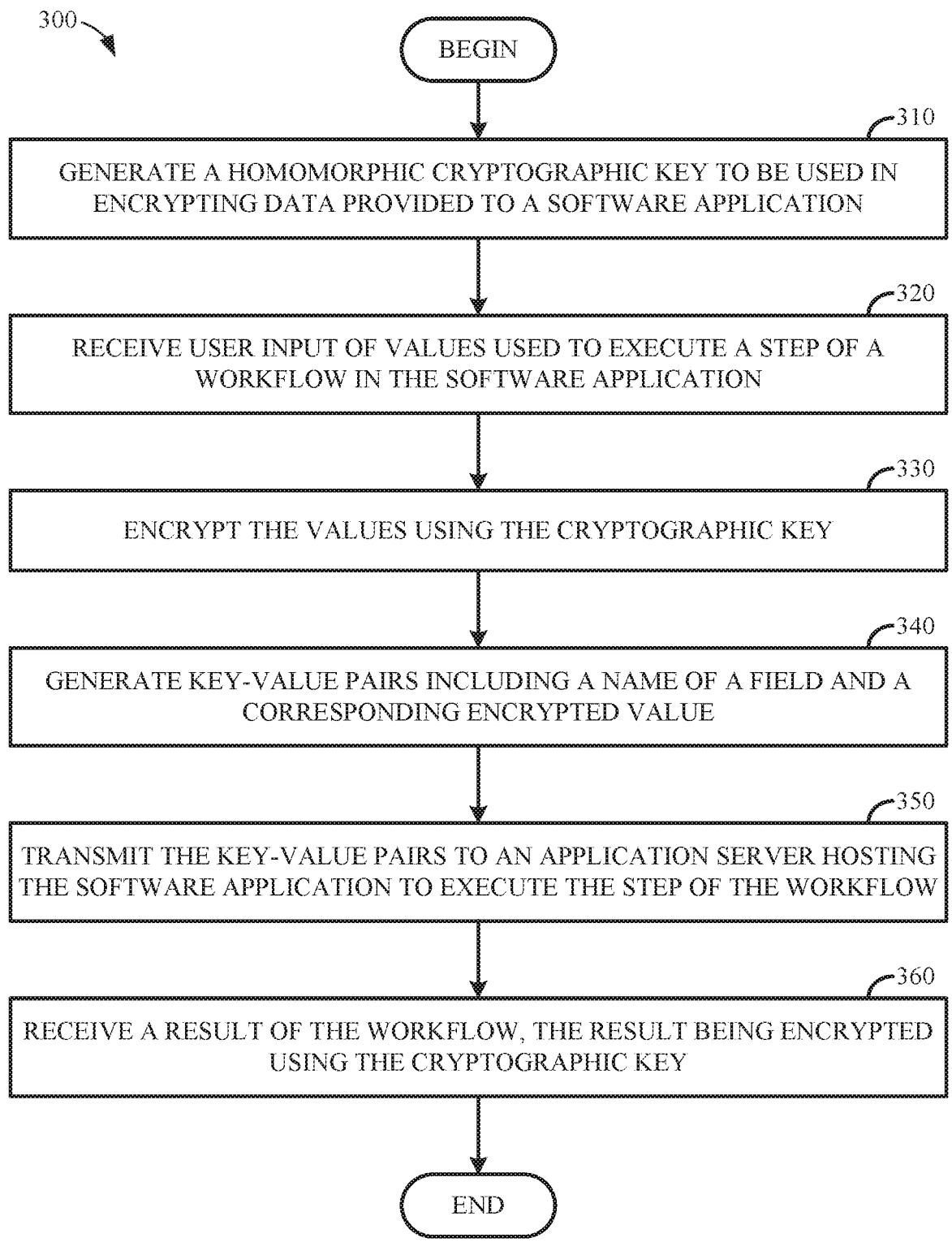
FIG. 3 illustrates example operations for initiating secure execution of a workflow in a software application from a client device.

FIG. 3 illustrates example operations for invoking privacy-preserving execution of a workflow from a client application. The operations described herein may be performed on a client device on which a client application is installed (e.g., client device 110 and client application 112 illustrated in FIG. 1) for interaction with workflow components of a software application hosted on an application server (e.g., application server 120 illustrated in FIG. 1). The client application, as discussed, may be installed on-demand or when a user initially interacts with the software application hosted on the application server (e.g., when the user signs up for an account to use the software application).

As illustrated, operations 300 begin at block 310, where the client device generates cryptographic keys to be used in homomorphically encrypting data provided to a software application for execution of a step in a workflow and decrypting the encrypted results generated by the software application. The cryptographic keys may comprise, for example, a symmetric cryptographic key used to encrypt data and a permutation of the symmetric cryptographic key used to decrypt data in a semi-symmetric cryptographic scheme, or an asymmetric encryption key (e.g., a public key component of a public/private key pair) used to encrypt data and an asymmetric decryption key (e.g., a private key component of a public/private key pair) used to decrypt data in an asymmetric cryptographic scheme. The cryptographic keys may be generated based on a random number generator and rules defined for cryptographic keys used in a homomorphic encryption scheme such that mathematical operations may be performed on values encrypted using the cryptographic key.

At block 320, during execution of the software application, the client device receives user input of values requested by the server application to execute a step in the workflow implemented in the software application. The user input may comprise textual strings, Boolean values, numerical values (integers or floating point), or other input data types that may be used in performing calculations in the workflow.

At block 330, the client device encrypts the values using the cryptographic key. As discussed, the encrypted values may be used in various mathematical operations at an application server (e.g., application server 120 in FIG. 1) without needing to be decrypted prior to use in those mathematical operations.

At block 340, the client device generates key-value pairs including the name of a field in which an input is entered and the corresponding encrypted value received as input at block 320. Generally, a key-value pair may be generated such that the name of the field is encoded in plaintext (e.g., as a series of ASCII values, Unicode values, etc.) while the value in the key-value pair is encrypted using the generated cryptographic key. If the key-value pairs are intercepted in transit between a client device and an application server, the intercepting party may be able to see that a value exists for a given input field for the workflow, but will not be able to retrieve the underlying value transmitted to the application server because the value associated with the key is encrypted.

At block 350, the client device transmits the generated key-value pairs to the application server so that the application server may execute a step of the workflow.

In some embodiments, the generated key-value pairs may be transmitted using the hypertext transfer protocol (HTTP), in which the key-value pairs may be encoded in a uniform resource locator (URL) when execution is invoked using HTTP GET and in which the key-value pairs are included in a message body when execution is invoked using HTTP POST. In another embodiment, the generated key-value pairs may be included in a representational state transfer (REST) function call used to invoke execution of the workflow step. In still further, embodiments, the generated key-value pairs may be included in graph query language function calls or other data packages used to invoke execution of the workflow step on a remote system.

In some embodiments, the client device may transmit an encryption key to the application server in conjunction with the generated key-value pairs. The encryption key, as discussed, may be a symmetric cryptographic key used in a semi-symmetric cryptographic scheme where decryption is performed using a permutation of the symmetric cryptographic key or the asymmetric encryption key in an asymmetric encryption/decryption key pair. As discussed, by providing the encryption key, but not the decryption key, to the application server, the application server cannot decrypt the encrypted values in the key-value pairs because different keys are used to encrypt and decrypt data. The encryption key may be transmitted as a key-value pair where the value is a predefined key. As discussed, the encryption key may be used at the application server to encrypt predefined values in the software application so that accurate mathematical operations can be performed using the encrypted values in the key-value pairs and the predefined values. Further, even if the encryption key is passed to the application server in the clear the values in the key-value pairs may not be decrypted because the encryption key cannot be used to decrypt encrypted values.

At block 360, the client device receives a result of the step of the workflow from the application server. As discussed, the received result is still encrypted as a result of the application server calculating the result using the encrypted values generated at block 330. Subsequently, to display the received result to a user of the client device, the client device can decrypt the received result using the decryption key generated at block 310, which may be a private key component of a public/private key pair or a derivative of an encryption key in a semi-symmetric encryption scheme.

In some embodiments, the client device can generate key-value pairs for the items requested by the workflow. The key-value pairs generally include a label associated with a respective item of the items and a corresponding homomorphically encrypted user input. The homomorphically encrypted user inputs comprise the generated key-value pairs.

In some embodiments, the encryption key comprises a public key portion of a public/private key pair and the decryption key comprises a private key portion of the public/private key pair. The client device can generate the public/private key pair and transmit, to the application server, the public key portion of the public/private key pair prior to invoking execution of the workflow in the remotely hosted software application. For example, generation and transmission of the public key portion of the public/private key pair may be performed when a user downloads and installs a client application on the client device.

In some embodiments, the encryption key comprises a generated cryptographic key and the decryption key comprises a derivative of the generated cryptographic key.

In some embodiments, the request to perform the step of the workflow includes the encryption key.

In some embodiments, the client device receives an electronic document including the homomorphically encrypted user input and homomorphically encrypted result of the step of the workflow. The client device generates a plaintext version of the electronic document by decrypting the homomorphically encrypted user input and homomorphically encrypted result of the step of the workflow and displays the plaintext version of the electronic document on the display coupled to the client device. In some embodiments, the electronic document may be partially encrypted such that non-sensitive data is included in the electronic copy of the document in plaintext.

Example Privacy-Preserving Execution of a Workflow in a Software Application

Figure 4:
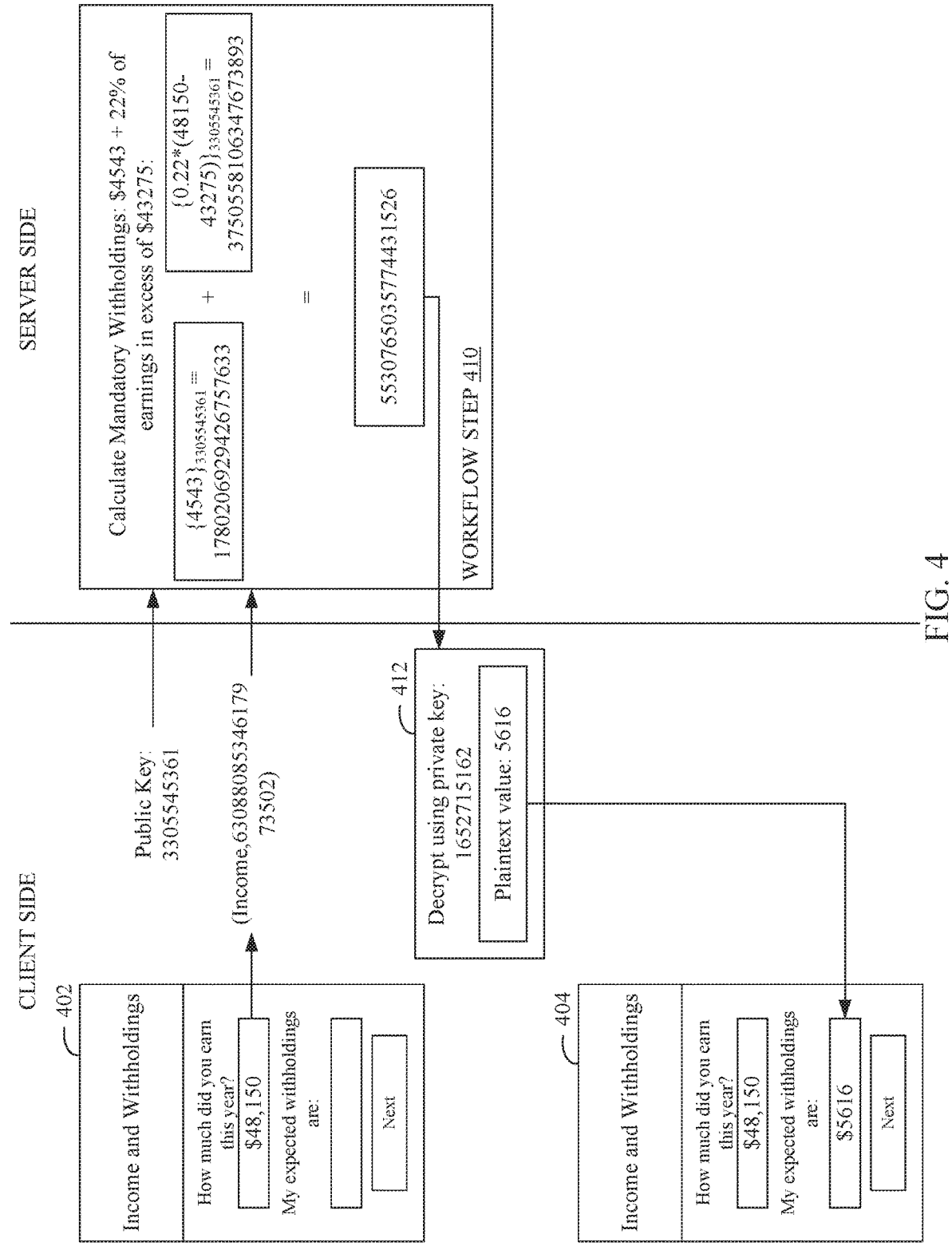
FIG. 4 illustrates an example secure execution of a workflow in a software application in which encrypted data is provided to a workflow and the workflow is executed without decrypting the provided data.

FIG. 4 illustrates an example privacy-preserving execution of a workflow step using homomorphically encrypted inputs so that the underlying data provided by a user of the software application remains encrypted during execution of the step of a workflow in the software application.

In this example, public and private keys may have been generated for the user prior to execution of the step of the workflow in the software application. As illustrated, the public key has a value of 3305545361 and the private key has a value of 1652715162. The public and private keys may have been generated locally on the client device in which screens 402 and 404 are displayed to a user or by a remote key management system. While the example illustrated in FIG. 4 illustrates encryption and decryption operations using a public/private key pairing, it should be recognized that any form of encryption that uses different keys for encryption and decryption of data (e.g., a cryptographic key and a permutation of the cryptographic key used for encryption and decryption, respectively) can be generated and used in privacy-preserving execution of the workflow in the software application.

As illustrated, the step of the workflow illustrated in screen 402 calculates an expected tax withholding for a given received income value. Suppose, as illustrated, the user enters the value "$48,150" into the income input box illustrated in screen 402. To preserve the privacy of this information, client device does not transmit a key-value pair of (Income, 48150) to the application server to execute workflow step 410. Rather, the client device encrypts the user-entered value using the public key to generate the ciphertext "6308808534617973502" and generates the key-value pair of (Income, 6308808534617973502) for transmission to the application server. The underlying user-entered value of "48,150" may not be recovered by applying the public key to the ciphertext.

To allow workflow step 410 to calculate the expected withholdings for the user, given the user's income of $48,150, the client device transmits two pieces of information to the application server in this example: the key-value pair of (Income, 6308808534617973502) and the public key of 3305545361. In some embodiments, the public key may have been transmitted to the application server prior to the user invoking execution of workflow step 410 (e.g., when a user logs into the application, registers to use the application, etc.), as a key-value pair (as discussed above), etc.

Workflow step 410 includes a plurality of rules that are used to calculate the expected amount of withholdings for the user given user input of a yearly income amount. Though not illustrated, workflow step 410 can compare the received income value to various threshold values to determine the rules to apply to calculate the expected amount of withholdings for a given user's income. For example, to identify which set of rules to apply to a given input, workflow step 410 can compare the encrypted input to upper and lower bounds defined for a range of incomes for which a particular set of rules applies. In this example, these upper and lower bounds are encrypted using the public key prior to execution of comparison operations against the received user input of an encrypted income amount so that the comparison operations may be performed against the encrypted, received income value. In this example, workflow step 410 determines that the applicable withholding rule for the user's income is $4,543 plus 22 percent of earnings in excess of $43,275.

To calculate the expected withholdings, workflow step 410 uses the public key to encrypt the predetermined value of $4,543 and the lower income bound of $43,275. A subtraction operation is performed to calculate the difference between the received user input and the lower income bound using the respective encrypted values, and a multiplication operation is performed to calculate 22 percent of the difference between the received user input and the lower income bound using an encrypted version of the floating point value 0.22 (i.e., 22/100) and the already-encrypted difference between the received user input and the lower income bound. The difference between the received user input and the lower income bound may be already encrypted, as discussed above, by virtue of the difference having been calculated from encrypted values.

As illustrated, the encrypted predetermined value of $4,543 resolves to the value "17802006929426757633", and 22 percent of the difference between the received user input and the lower income bound resolves to the value "3750558106347673893". Workflow step 410 can add these two values together to result in the value "5530765035774431526", and this value may be returned to the client device for decryption and presentation to the user.

At decryption operation 412, a client application executing on the client device decrypts the received value of "5530765035774431526" using the private key previously generated for the user of the client device (e.g., as illustrated, the private key "1652715162"). Using the private key, the client operation retrieves the plaintext value "5616" from the received data, and this retrieved plaintext value is displayed in screen 404 illustrating the results of workflow step 410. It should be noted that the encrypted income value provided by the client device to the application server is never decrypted at the application server, which preserves the privacy of any user-provided data.

Figure 5:
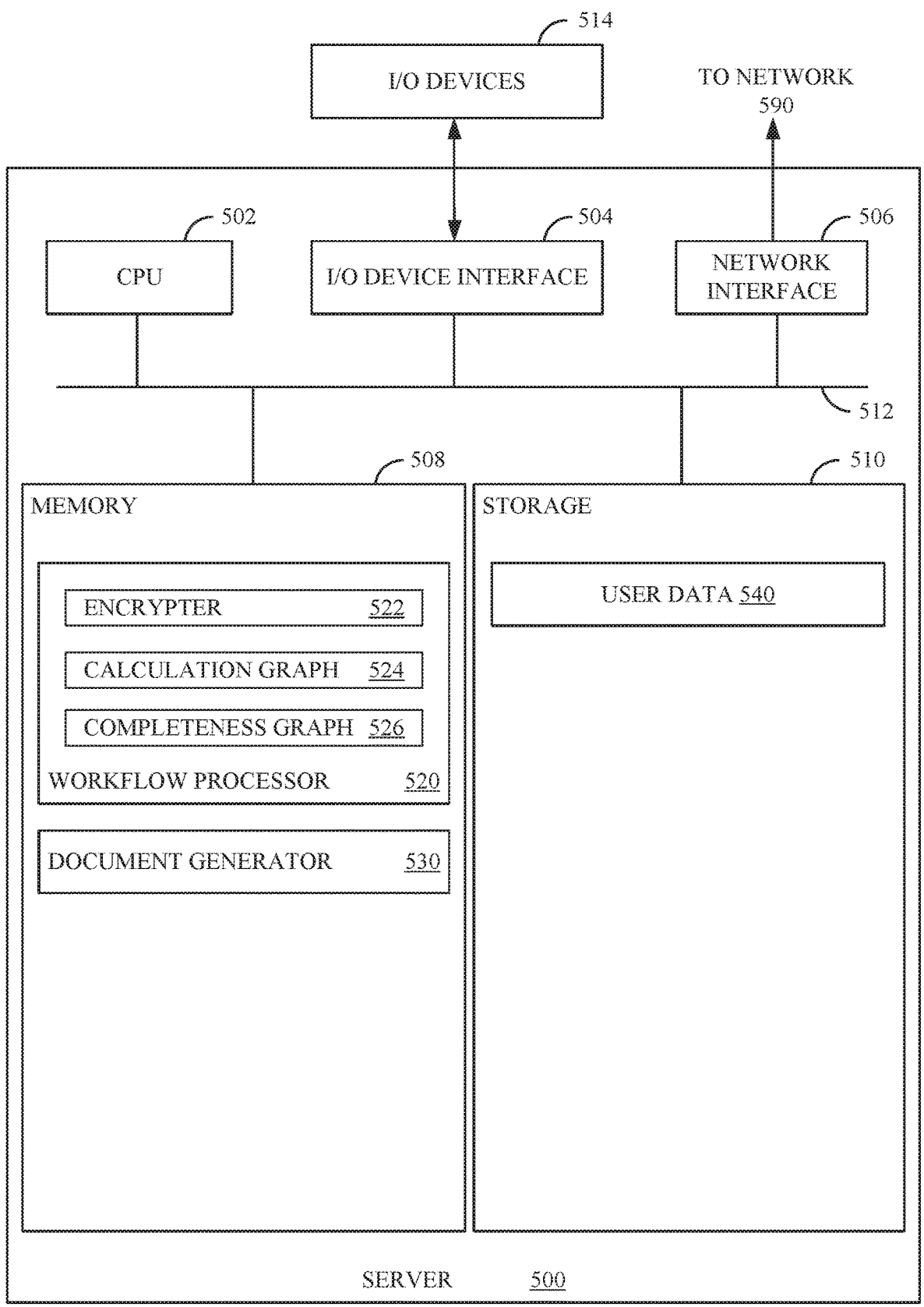
FIG. 5 illustrates an example computing system with which embodiments of the present disclosure may be implemented.

Example Systems for Privacy-Preserving Execution of a Workflow in a Software Application FIG. 5 illustrates an example server 500 on which workflows in a software application are executed in a manner that preserves the privacy of user-provided data used in executing these workflows. For example, server 500 may be representative of application server 120 illustrated in FIG. 1.

As shown, server 500 includes a central processing unit (CPU) 502, one or more I/O device interfaces 504 that may allow for the connection of various I/O devices 515 (e.g., keyboards, displays, mouse devices, pen input, etc.) to the server 500, network interface 506 through which server 500 is connected to network 590 (which may be a local network, an intranet, the internet, or any other group of computing devices communicatively connected to each other), a memory 508, storage 510, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510.

CPU 502 is included to be representative of a single CPU, multiple CPUs, a single CPU having multiple processing cores, and the like.

Memory 508 is representative of a volatile memory, such as a random access memory, or a nonvolatile memory, such as nonvolatile random access memory, phase change random access memory, or the like. As shown, memory 508 includes a workflow processor 520 and a document generator 530. While workflow processor 520 and document generator 530 are illustrated as separate components in FIG. 5, it should be recognized that the functionality of workflow processor 520 and document generator 530 may be implemented in one or more functional modules loaded into memory 508 for execution by CPU 502

Workflow processor 520 generally is configured to receive encrypted inputs representing data used in calculating a result of a step in a workflow and an encryption key used to encrypt the received encrypted inputs. Workflow processor 520 can perform various mathematical operations using the encrypted inputs to generate a result of a workflow step that is also encrypted by virtue of having been calculated using encrypted inputs.

In some embodiments, where a workflow step includes one or more predefined values that are used in generating a result of the workflow step, workflow processor 520 can include an encrypter 522 that uses the encryption key to encrypt the predefined values prior to performing mathematical operations using the predefined values and the received encrypted inputs. Workflow processor 520 can commit the received encrypted inputs and any calculated results from the encrypted inputs in user data 540 for future use.

As discussed above, in some embodiments, workflow processor 520 can implement a workflow as a calculation graph 524 and a completeness graph 526. Encrypted inputs may be inserted into one or more nodes in the calculation graph 524 and processed according to rules defined in the calculation graph 524. The output of one operation in the calculation graph 524—inherently encrypted by virtue of having been generated by performing mathematical operations on encrypted inputs—may be used as input to another operation in the calculation graph 524 such that each calculation performed by traversing through the calculation graph 524 results in the generation of an encrypted result. The completeness graph 526 may be used to track the data that has been provided to the calculation graph during execution of the workflow and determine whether sufficient information has been provided to the application in order to generate a result of the overall workflow (and, in some embodiments, any documents generated by the workflow).

Document generator 530 generally uses the encrypted inputs and encrypted workflow results generated by workflow processor 520 to generate electronic documents for the workflow. The electronic documents may include unencrypted and encrypted data. Non-sensitive data, such as line labels or other textual content, may be unencrypted, while the values associated with each line may be encrypted. As discussed, the encrypted values may be encrypted using an encryption key such that the values included in the generated document are invalid or meaningless until the underlying values are extracted by decrypting the encrypted values. The generated documents may be stored in user data 540 for future retrieval.

Storage 510 is representative of a non-volatile memory, such as a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN).

Storage 510, as illustrated, may include user data 540. User data 540 may represent a repository in which encrypted inputs, encrypted calculation results, and encrypted documents are stored for a user. The encrypted inputs and calculation results may be stored in user data 540 so that execution of a workflow can be paused and resumed on-demand. While FIG. 5 illustrates user data 540 stored in storage 510, it should be recognized that workflow processor 520 and document generator 530 may obtain encrypted user data from remote data stores or from a client device via network interface 506 for use in executing steps of a workflow in a software application hosted by server 500 and generating electronic documents resulting from execution of the workflow including the encrypted user data and encrypted results of the workflow.

Figure 6:
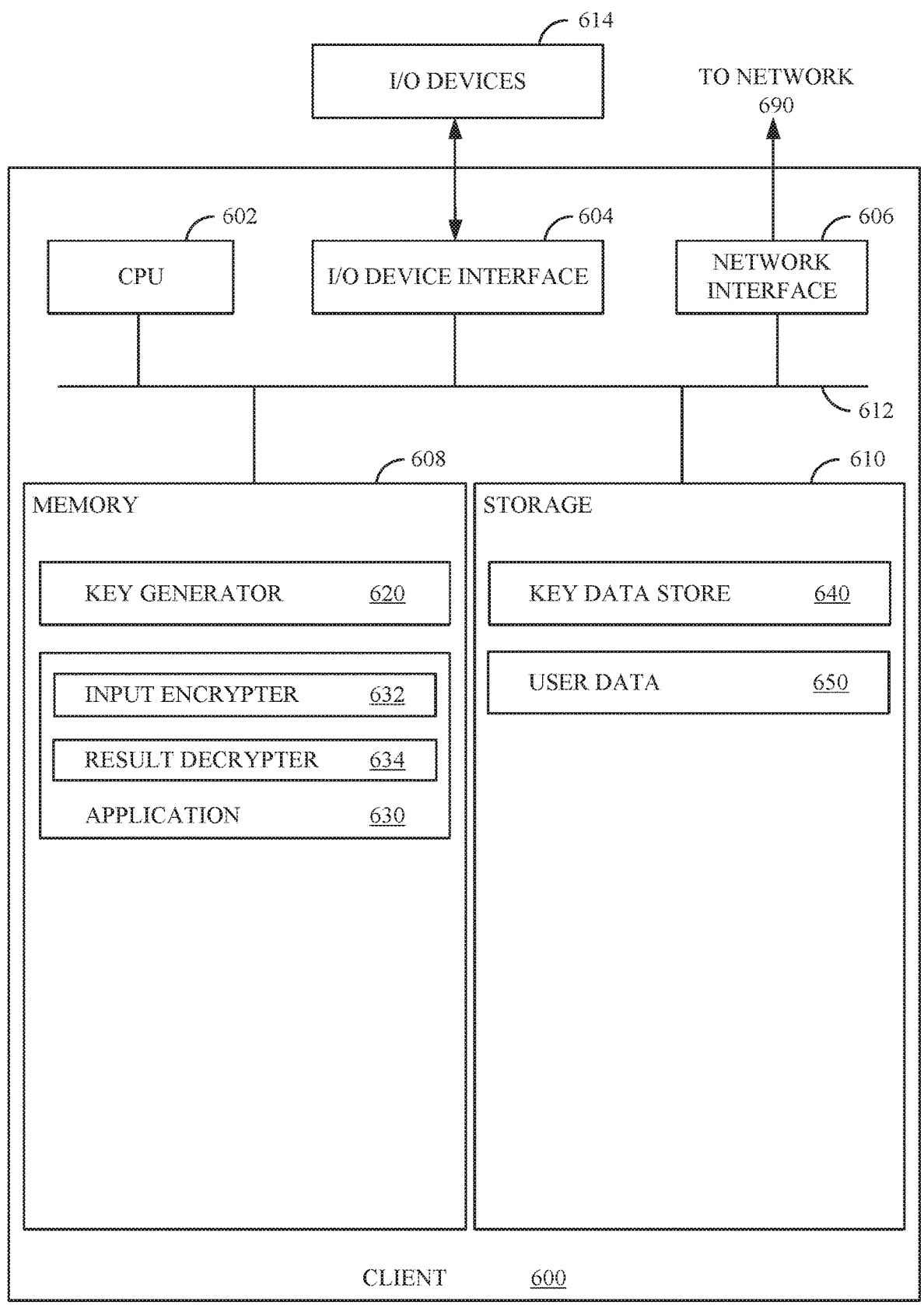
FIG. 6 illustrates an example client device on which embodiments of the present disclosure may be implemented.

FIG. 6 illustrates an example client 600 on which an application executes to provide encrypted inputs to an application server for execution of steps in a workflow and receive encrypted results of the steps in the workflow. For example, client 600 may be representative of client device 110 illustrated in FIG. 1.

As shown, client 600 includes a central processing unit (CPU) 602, one or more I/O device interfaces 604 that may allow for the connection of various I/O devices 616 (e.g., keyboards, displays, mouse devices, pen input, etc.) to the client 600, network interface 606 through which client 600 is connected to network 690 (which may be a local network, an intranet, the internet, or any other group of computing devices communicatively connected to each other), a memory 608, storage 610, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610.

CPU 602 is included to be representative of a single CPU, multiple CPUs, a single CPU having multiple processing cores, and the like.

Memory 608 is representative of a volatile memory, such as a random access memory, or a nonvolatile memory, such as nonvolatile random access memory, phase change random access memory, or the like. As shown, memory 608 includes a key generator 620, and an application 630.

Key generator 620 is generally configured to generate encryption and decryption keys for use in encrypting user-provided inputs prior to transmission to an application server and decrypting the results of a workflow returned from the application server, respectively. As discussed, key generator 620 is generally configured to generate cryptographic keys such that a first key (e.g., a public key in a public/private key pairing or a generated key in a semi-symmetric encryption scheme) is used to encrypt user-provided data and a second key (e.g., a private key in a public/private key pairing or a derivative of the generated key in a semi-symmetric encryption scheme) is used to decrypt the user-provided data and results returned from the application server. In some embodiments, key generator 620 may be configured to store the generated key in key data store 650 locally for use in encrypting and decrypting data and provide the generated encryption key to an application server for use in encrypting predetermined values prior to execution of various operations on the encrypted user-provided inputs.

Application 630 generally invokes privacy-preserving execution of a workflow in a remotely hosted software application. As illustrated, application 630 includes an input encrypter 632 and a result decrypter 634. Input encrypter 632 generally retrieves user input from a user interface displayed on an I/O device 614 and generates encrypted key-value pairings for transmission to an application server. User inputs may be encrypted using the generated encryption key, and input encrypter 632 can generate key-value pairings including key information encoded in plaintext and the encrypted user inputs. These key-value pairings may be transmitted by application 630 to the application server in a request to execute a step of a workflow.

Result decrypter 634 generally receives a result generated from execution of a workflow step (e.g., invoked by transmission of a request to execute the step of the workflow generated by application 630) and decrypts the received result for display to a user of client 600. The result may be a single value generated by executing a particular step of a workflow or the values generated by executing the workflow in its entirety. In some embodiments, result decrypter 634 may further decrypt encrypted values included in electronic documents returned from the application server, as discussed above.

Storage 610 is representative of a non-volatile memory, such as a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN). As illustrated, storage 610 includes a key data store 640 and user data 650. Key data store 640 generally provides a secure location in which cryptographic keys generated by key generator 620 are stored for future use (e.g., transmission of the public key to an application server during execution of the workflow in the software application, encryption of user-provided data to be used as inputs into the workflow, decryption of results generated by the workflow and returned to the client 600, etc.). User data 650 generally provides a location in which encrypted user-provided inputs and any documents generated including the encrypted user-provided inputs and encrypted results generated by a remotely hosted software application are stored for future retrieval.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for invoking privacy-preserving execution of a workflow in a remotely hosted software application, comprising: displaying a prompt for user input associated with items to be used in performing a step of a workflow in the remotely hosted software application; receiving user input for each of the items to be used in performing the step of the workflow; homomorphically encrypting the user input for the input data using an encryption key; transmitting, to an application server, the homomorphically encrypted user input and a request to perform the step of the workflow using the homomorphically encrypted user input; receiving, from the application server, a homomorphically encrypted result of the step of the workflow; decrypting the received homomorphically encrypted result using a decryption key paired with the encryption key; and displaying the result on a display coupled to the client device; and generating key-value pairs for the items, each key-value pair including a label associated with a respective item of the items and a corresponding homomorphically encrypted user input, wherein the homomorphically encrypted user inputs comprise the generated key-value pairs.

2. The method of claim 1, wherein the encryption key comprises a public key portion of a public/private key pair and the decryption key comprises a private key portion of the public/private key pair.

3. The method of claim 2, further comprising:
generating the public/private key pair; and
transmitting, to the application server, the public key portion of the public/private key pair prior to invoking execution of the workflow in the remotely hosted software application.

4. The method of claim 1, wherein the encryption key comprises a generated cryptographic key and the decryption key comprises a derivative of the generated cryptographic key.

5. The method of claim 1, wherein the request to perform the step of the workflow includes the encryption key.

6. The method of claim 1, further comprising:
receiving an electronic document including the homomorphically encrypted user input and homomorphically encrypted result of the step of the workflow;
generating a plaintext version of the electronic document by decrypting the homomorphically encrypted user input and homomorphically encrypted result of the step of the workflow; and
displaying the plaintext version of the electronic document on the display coupled to the client device.

7. The method of claim 6, wherein the electronic document is partially encrypted such that non-sensitive data is included in the electronic copy of the document in plaintext.

8. A system, comprising: a processor; and a memory having instructions stored thereon which, when executed by the processor, performs an operation for invoking privacy-preserving execution of a workflow in a remotely hosted software application, the operation comprising: displaying a prompt for user input associated with items to be used in performing a step of a workflow in the remotely hosted software application; receiving user input for each of the items to be used in performing the step of the workflow; homomorphically encrypting the user input for the input data using an encryption key; transmitting, to an application server, the homomorphically encrypted user input and a request to perform the step of the workflow using the homomorphically encrypted user input; receiving, from the application server, a homomorphically encrypted result of the step of the workflow; decrypting the received homomorphically encrypted result using a decryption key associated with the encryption key; and displaying the result on a display coupled to the client device; and wherein the operation further comprises: generating key-value pairs for the items, each key-value pair including a label associated with a respective item of the items and a corresponding homomorphically encrypted user input, wherein the homomorphically encrypted user inputs comprise the generated key-value pairs.

9. The system of claim 8, wherein the operation further comprises:

generating the encryption key and the decryption key as one of a public/private key pair or a cryptographic key and a derivative of the cryptographic key; and transmitting, to the application server, the encryption key prior to invoking execution of the workflow in the remotely hosted software application.

10. The system of claim 8, wherein the operation further comprises:

completing execution of the workflow in the software application;

receiving an electronic document including the homomorphically encrypted user input and homomorphically encrypted result of the step of the workflow;

generating a plaintext version of the electronic document by decrypting the homomorphically encrypted user input and homomorphically encrypted result of the step of the workflow; and displaying the plaintext version of the electronic document on the display coupled to the client device.

* * * * *